United States Patent Office 3,388,930
Patented June 18, 1968

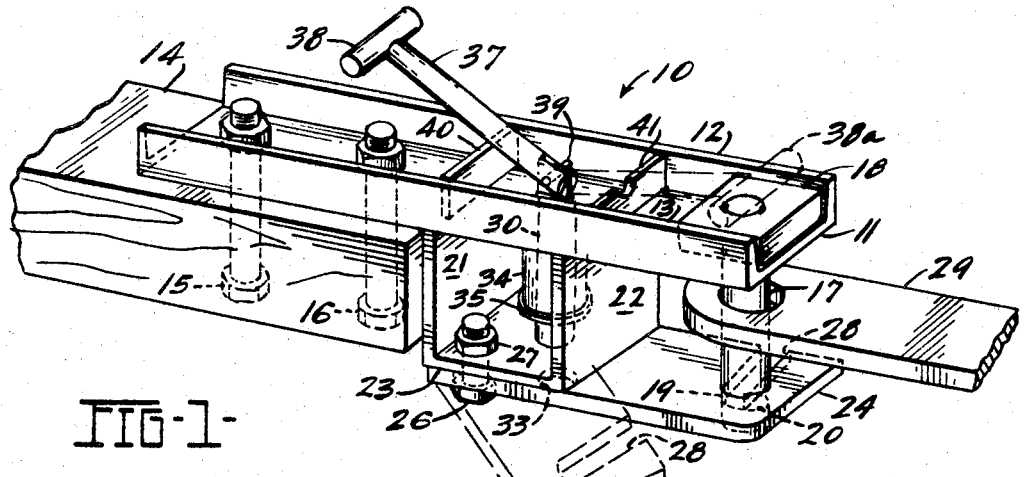
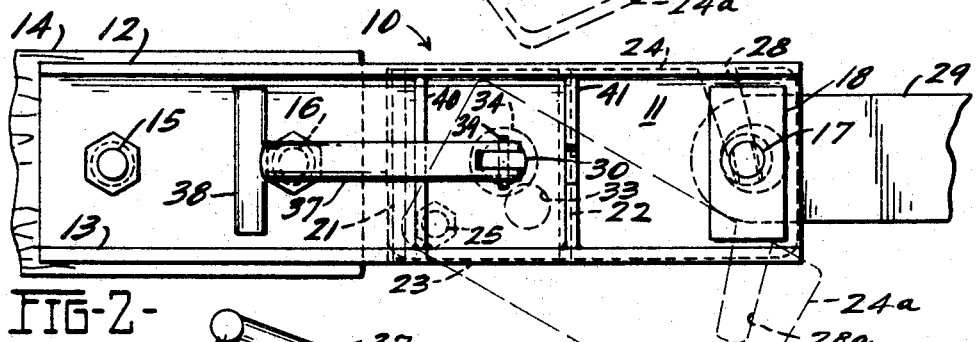
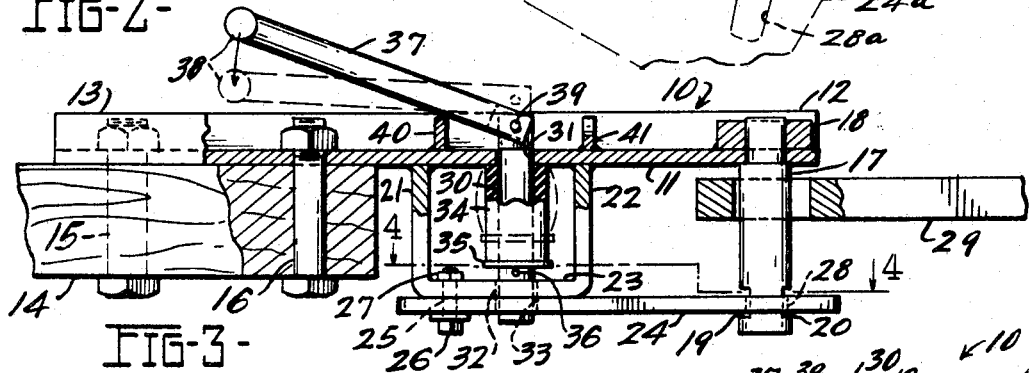
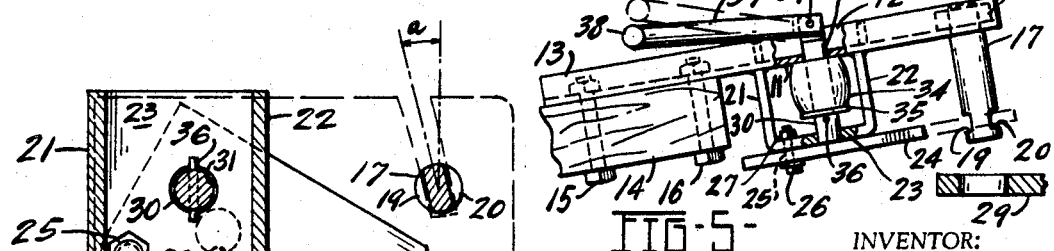
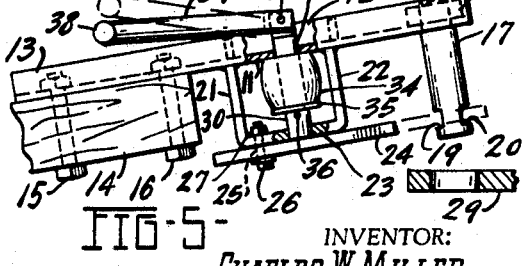
INVENTOR:
CHARLES W. MILLER.
ATT'YS.

3,388,930
COUPLING DEVICE
Charles W. Miller, P.O. Box 127, Portage, Ohio 43451
Filed Oct. 19, 1966, Ser. No. 587,745
7 Claims. (Cl. 280—504)

ABSTRACT OF THE DISCLOSURE

A coupling device for securing together a pair of vehicles, such as a tractor and a drawn implement. The device includes an elongate rigid member with one end secured to one vehicle and a draw pin secured to its other end. The draw pin is inserted through an aperture in the draw bar of the other vehicle. Spaced from the elongate member is a pivoted plate which swings from an open position away from the draw pin to a closed position adjacent the free end of the draw pin to prevent removal of the draw bar. A manually operable lock to hold the pivoted plate in closed position includes an axially movable bolt which extends through the elongate member and a locking recess in the pivot plate when in locked position and a resilient means urging the lock bolt towards its locked position. The pivot plate preferably has a slot which receives the lower end of the draw pin when in closed position so that forces exerted upon the pin are transmitted to the plate. A lever is pivotally secured to the upper end of the lock bolt so that a relatively small force exerted on the lever is sufficient to overcome the resilient means and to move the bolt to its unlocked position.

---

This invention relates to an improved device for coupling a first vehicle to a second vehicle. More specifically, this invention relates to an improved coupling device for securing one vehicle to the draw bar of a second vehicle, which device has a fixed draw pin which extends through an aperture in the draw bar of the second vehicle and which includes a means for locking or preventing removal of the draw bar from the draw pin.

A number of devices are commonly used for temporarily but securely coupling a pair of vehicles, such as a farm tractor and a drawn farm implement together. The devices must be capable of securely attaching the vehicles together, must be rugged enough to withstand considerable force as when the drawn vehicle is a heavy wagon or plow, and must be easily manipulated. The devices must be simple and easy to operate, particularly in situations of adverse weather where the operator must quickly couple and uncouple the vehicles together with a minimum of manipulations in a minimum of time.

Because the coupling devices undergo severe loading and shock, devices which have a fixed drawn pin which extends through the draw bar, such as that disclosed in U.S. Patent 2,835,510 are commonly used. Such devices, however, have certain disadvantages in that the method of preventing the unintentional removal of the draw bar from the draw pin requires the use of a toggle, bolt or pin which is difficult to operate in adverse conditions and also is subject to breakage. Other types of devices which have a movable draw pin, such as disclosed in U.S. Patent 1,448,950 are more convenient to operate but are less sturdy because the force applied to the draw pin in transferred to a pivot or other movable joint.

The invention of this application is advantageous in that it has a draw pin which is rigid and securely fixed to one of the vehicles and includes a means for securely and positively preventing unintentional removal of the draw bar from the fixed draw pin.

Accordingly, it is an object of this invention to provide a device for coupling together a pair of vehicles which device includes a rigid draw pin secured to one of the vehicles and adapted to be received by the draw bar of the second vehicle and further includes means for securely preventing unintentional uncoupling of the vehicle.

Another object of this invention is to provide a device for coupling two vehicles together, which device includes a draw pin rigidly secured to one vehicle at one end and a coupling means which prevents unintentional uncoupling of the vehicles and provides support for the free end of the draw pin.

It is still another object of this invention to provide a device for coupling vehicles together which includes a positive locking means for the prevention of unintentional uncoupling of the vehicles, which locking means includes a minimum of moving parts which are simple and free from interruption by adverse weather, such as icing, etc.

Other objects and advantages of the invention will be apparent to those skilled in the art from the following detailed description of a preferred embodiment thereof, reference being made to the accompanying drawings in which:

FIG. 1 is a view in perspective of a preferred embodiment of this invention, showing it secured to a member secured to one vehicle on the left of the drawing and showing it associated with the draw bar of a second vehicle on the right of the drawing;

FIG. 2 is a plan view of the coupling device shown in FIG. 1;

FIG. 3 is a view in elevation of the coupling device shown in FIG. 1;

FIG. 4 is a partial cross sectional view taken along line 4—4 of FIG. 3 and showing the cooperation of the draw pin with its locking member; and FIG. 5 is a view in elevation, on a reduced scale, showing the device being inserted into the draw bar of a vehicle with its locking mechanism in unlocked position.

Referring first to FIG. 1, the improved coupling device of this invention includes an elongate member, generally designated by reference numeral 10, which is comprised of a flat web 11 and a pair of vertical rails 12 and 13 which form an elongate channel. This elongate member 10 may be conveniently fabricated from channel steel. One end of the elongate member 10 is secured to the tongue 14 of the first vehicle, which may be the vehicle to be drawn, such as a farm implement. As shown in the drawings, a pair of bolts 15 and 16 extend through the tongue 14 and the web 11 to securely hold the elongate member 10 in place.

At the other end of the elongate member 10, a draw pin 17 is secured at its upper end by welding or otherwise attaching it to a block 18 which is welded or otherwise secured between the rails 12 and 13 on the upper surface of the web 11. The free or lower end of the draw pin 17 extends downwardly, as best seen in FIG. 3, and has a pair of opposed slots 19 and 20 adjacent its lower, free end.

Secured to the lower surface of the web 11 adjacent the outermost end of the tongue 14 is a rectangular frame including vertical sidewalls 21 and 22 and a horizontal web 23 which extends generally parallel to the web 11 of the elongate member 10. The frame, including the sidewalls 21 and 22 and the web 23 may be conveniently fabricated of channel steel and welded to the lower surface of the elongate member 10 as shown in the drawings.

A locking arm 24 is pivotally secured adjacent the lower surface of the web 23 of the frame by a pivot pin 25 which extends through an aperture in the locking arm 24 and the web 23 and is held in place by a head 26 and a lock nut 27. Any other suitable means of securing the pivot pin, such as a rivet-type formed head may be satisfactory. As best seen in FIG. 1, the locking arm 24 is adapted to be pivoted or swung from a closed position as shown in the full line drawing to an open position, as shown in the dotted line drawing and designated by reference numeral 24a. The locking arm 24 includes a transverse slot 28 having a width which is sufficient to receive the draw pin 17 at its reduced portion adjacent the slots 19 and 20. The width of the slot 28 is less than the unreduced diameter of the draw pin 17 so that, when in its locked position, the lower surfaces of the slots 19 and 20 will support the locking arm 24 against a force exerted downwardly toward the free end of the draw pin 17.

Referring to FIG. 2, it is to be noted that the position of the pivot pin 25 is offset from the elongate axis of the locking arm 24 and elongate member 10 such that a tangential line extending through the axis of the draw pin 17 on a circle whose center is the axis of the pivot pin 25 is at an angle to the elongate axis of the locking arm 24 and is thus at an angle to the direction of pull on the coupling device. As schematically indicated in FIG. 4, this angle is designated as "a."

Because the transverse slot 28 extends at a rearward angle to a line normal to the axis of the elongate member 10, the device of this invention provides an additional feature for preventing the unintentional uncoupling of the vehicles. When the device is secured to a draw bar 29 of the second vehicle, such as a tractor, a force is exerted on the draw bar 29 in the direction of the arrow shown in FIG. 2, there is no tendency for the draw pin 17 to slip out of the slot 28 in the locking arm 24 because the slot extends away from the direction of the force. Even if the force is not directly in an axial direction, such as may be the case when the vehicles are turning a corner, the angled slot 28 assures that the draw pin 17 will remain in position at the end portion of the slot 28.

As has been previously explained, the locking arm 24 may be pivoted between its closed position wherein the draw pin 17 is snugly held within the slot 28 to its open position, at which the free end of the draw pin 17 is unobstructed and may receive a draw bar 29 from the second vehicle, as is shown in FIG. 5. The preferred embodiment of this invention further includes a means for securely holding the locking arm 24 in its closed position. This lock means includes a lock pin 30 extending through a pair of aligned apertures 31 and 32 in the web 11 of the elongate member 10 and the web 23 of the frame respectively. As best seen in FIG. 2, the locking arm 24 includes a locking aperture 33 which, when the locking arm 24 is in its closed position, is in alignment with the apertures 31 and 32 and receives the lock pin 30. Referring to FIGS. 3 and 5, a resilient compressible member 34 is placed circumjacent the lock pin 30 with a thrust washer 35 adjacent its lower end. Below the thrust washer 35, a cotter pin 36, or other stop member, extends through the lock pin 30 to prevent the thrust washer 35 from moving below its position. At the upper end of the lock pin 30 above the elongate member 10. As indicated in FIG. 1, tached by a hinge pin 39 to the top end of the lock pin 30 above the elongate member 10. As indicated in FIG. 1, the handle 37 and its grip 38 may be swung from the full line position to any other position such as that indicated in dotted line and designated by reference numeral 38a.

The operation of the locking pin is as follows. With the locking arm 24 in its closed position, as shown in full line in FIG. 1, the lock pin 30 extends through the locking aperture 33 in the locking arm 24 as also seen in FIG. 3, to securely hold the locking arm 24 in closed position. When it is desired to remove or change the hitch, such as to remove the draw bar 29 from the draw pin 17, the handle 37 is pressed downwardly by a force exerted in the direction of the arrow against its grip 38, as indicated in FIG. 3. The handle 37 pivots on the upper surface of one of the transverse rails 40 or 41 to raise the lock pin 30 by axially compressing the resilient member 34 between the thrust washer 35 and the lower surface of the web 11 of the elongate member 10. It will be seen from FIG. 3 that, because of the mechanical advantage of the lever comprised of the handle 37 that only a small amount of force is necessary to raise the lock pin 30 against the resilient force from the resilient member 34. Preferably, the resilient member 34 is a tubular rubber member which is less susceptible to fouling by dirt or ice than other resilient means. However, suitable encased coil springs, etc. may be used.

When the lock pin 30 is raised to a position where its lower end is free of the locking aperture 33 and above the locking arm 24, the locking arm 24 may be pivoted about the pivot pin 25 to its open position, thus permitting the withdrawal or insertion of a draw bar 29 upon the pin. Because the lock pin 30 is always biased towards its lowermost position, it will rest upon the upper surface of the locking arm 24 when it is not within the locking aperture 33 and, due to the friction between the end of the lock pin and this upper surface, will prevent the locking arm from loosely swinging when in open position. When the locking arm 24 is returned to its closed position, the lock pin will automatically snap into the locking aperture 33.

In addition to the aforementioned advantages of this device, there are several advantages in its operation. Because of the construction of the elongate member 10 with its side rails 12 and 13, a continuous surface around the lock pin is presented to engage the handle 37 and to act as a pivot point for raising the lock pin 30. Thus the device may be coupled and uncoupled with the handle 37 extending in any direction, to the convenience of the operator. Additionally, once lock pin 30 has been disengaged from the locking aperture 33 and rests upon a portion of the upper surface of the locking arm 24, it is no longer necessary for the operator to manipulate the handle because return of the locking arm 24 to its closed position will automatically snap the lock pin 30 back in place in the locking aperture 33. This permits the operator to use both hands in engaging the draw bar 29 with the draw pin 17. Because the locking arm 24 swings to open position to one side of the hitch, it is convenient for the operator to use his knee or other part of his body to urge the locking arm 24 back into closed position, thus allowing for the use of both hands.

Finally, as seen in FIG. 4, because the pivot axis of the locking arm 24 is placed to one side of the locking arm 24, it allows the locking arm to be opened wider than normal before the lock pin 30 comes to the edge or end of the upper surface of the locking arm 24.

It will be apparent that various changes and modifications can be made in the specific details of the preferred embodiment discussed above, without departing from the scope and spirit of the attached claims.

I claim:

1. A device for coupling a first vehicle to the draw bar of a second vehicle comprising, in combination, an elongate member having one end adapted to be secured to said first vehicle with the other end extending outwardly therefrom, a draw pin adapted to be received by the draw bar of said second vehicle with its upper end rigidly secured to said other end of said elongate member and extending downwardly therefrom, a second elongate member spaced below said first elongate member, pivot means securing said second elongate member below said first member on an axis parallel to said pin with said pivot axis and said pin being in a plane substantially parallel to said first elongate member whereby the free end of said second member may be pivoted from a closed position adjacent the lower end of said pin and an open position away from said pin, said second elongate member having an open slot adapted to closely receive said draw pin when said second elongate member is in closed position, said slot extending through a lateral edge of said second elongate member in a lateral direction substantially normal to said plane when in said closed position whereby forces exerted upon said draw pin in a direction parallel to said elongate members will cause said draw pin to bear against the edges of said slot, and manually operable means for locking said second elongate member in said closed position.

2. The device of claim 1 wherein said pivot means securing said second elongate member below said first member includes a frame secured to said first member with a pair of walls extending downwardly away from said first member with a cross web secured to said walls and extending parallel to and spaced apart from said first elongate member, a pivot pin extending normally through said cross web and said second elongate member, and means secured to each end of said pivot pin whereby said second elongate member is pivotally secured to said cross web on a pivot axis normal to said draw pin.

3. The device of claim 1 wherein said means for locking said second elongate member in said closed position includes an axially slidable lock pin extending parallel to said draw pin and said pivot axis through an aperture in said first elongate member and an aperture in said second elongate member, stop means secured to said lock pin for limiting its axial movement between a lower position at which said lock pin extends through said aperture in said second elongate member and an upper position which said lock pin is above said second elongate member, means for biasing said lock pin toward its axially lower position, and a handle secured to said lock pin for manually raising said pin to its upper position.

4. The device of claim 5 wherein said bias means is a resilient member circumjacent said lock pin and compressed between the lower surface of said first elongate member and a member secured to said lock pin.

5. The device of claim 5 wherein said handle comprises a rigid arm pivotally secured to the upper end of said lock pin and which further includes a wall member secured to the upper surface of said first elongate member having a bearing surface substantially parallel to and spaced above said upper surface adjacent said lock pin whereby said rigid arm, when positioned over and pivoted downwardly upon said bearing surface, will cause said lock pin to move to its upper position against the force of said biasing means.

6. The device of claim 5 wherein the axes of said draw pin and said lock pin are in a common plane substantially parallel to said first and said second elongate members when in closed position and the axis of said pivot means is parallel to said plane but spaced therefrom.

7. The device of claim 7 wherein said first elongate member comprises a channel iron having a pair of spaced apart parallel sides secured to a web which comprises the upper surface of said first elongate member and wherein said wall member extends between said parallel sides with said bearing surface extending parallel to the uppermost edges of said parallel sides.

References Cited

UNITED STATES PATENTS 2,591,916    4/1952    L. W. Caugham _____ 280—504
2,835,510    5/1958    E. Shoneberg _____ 280—504

FOREIGN PATENTS 919,725    2/1963    Great Britain.

BENJAMIN HERSH, *Primary Examiner.*

R. SONG, *Assistant Examiner.*

UNITED STATES PATENT OFFICE
CERTIFICATE OF CORRECTION

Patent No. 3,388,930　　　　　　　　　　　June 18, 1968

Charles W. Miller

It is certified that error appears in the above identified patent and that said Letters Patent are hereby corrected as shown below:

Column 1, line 63, "in" should read -- is --. Column 3, line 56, cancel "30 above the elongate member 10. As indicated in FIG. 1," and insert -- 30, a release handle 37 having a grip 38 is pivotally at- --. Column 5, lines 29 and 33, Column 6, line 10, "5", each occurrence, should read -- 3 --. Column 6, line 15, "7" should read -- 5 --.

Signed and sealed this 30th day of September 1969.

(SEAL)

Attest:

Edward M. Fletcher, Jr.

Attesting Officer

WILLIAM E. SCHUYLER, JR.

Commissioner of Patents